(12) United States Patent
Falkinder et al.

(10) Patent No.: US 12,306,941 B2
(45) Date of Patent: May 20, 2025

(54) RANSOMWARE DETECTION IN A DEDUPLICATION STORAGE SYSTEM

(71) Applicant: HEWLETT PACKARD ENTERPRISE DEVELOPMENT LP, Houston, TX (US)

(72) Inventors: David Malcolm Falkinder, Bristol (GB); Peter Thomas Camble, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 253 days.

(21) Appl. No.: 18/050,125

(22) Filed: Oct. 27, 2022

(65) Prior Publication Data

US 2024/0143755 A1    May 2, 2024

(51) Int. Cl.
*G06F 21/56*    (2013.01)

(52) U.S. Cl.
CPC ...... *G06F 21/561* (2013.01); *G06F 2221/034* (2013.01)

(58) Field of Classification Search
CPC ...... G06F 21/56; G06F 21/561; G06F 21/565; H04L 63/12; H04L 63/123; H04L 63/126; H04L 63/14; H04L 63/1433
See application file for complete search history.

(56) References Cited

U.S. PATENT DOCUMENTS

| | | | |
|---|---|---|---|
| 10,819,738 B2 | 10/2020 | Saad | |
| 10,943,011 B2 | 3/2021 | Gaurav et al. | |
| 11,113,156 B2 | 9/2021 | Brewer et al. | |
| 11,144,638 B1 | 10/2021 | Golden | |
| 11,500,788 B2 * | 11/2022 | Miller | G06F 21/6218 |
| 11,657,155 B2 * | 5/2023 | Pendlebury | G06F 21/6218 |
| | | | 726/23 |
| 11,675,898 B2 * | 6/2023 | Kutner | G06F 11/2094 |
| | | | 726/23 |
| 11,720,692 B2 * | 8/2023 | Miller | H04L 9/30 |
| | | | 713/193 |
| 11,720,714 B2 * | 8/2023 | Miller | G06F 3/0622 |
| | | | 726/26 |
| 11,755,751 B2 * | 9/2023 | Child | G06F 21/566 |
| | | | 726/23 |
| 11,853,576 B2 * | 12/2023 | Butt | G06F 3/067 |
| 11,907,162 B2 * | 2/2024 | Thomsen | G06F 21/602 |
| 11,914,882 B2 * | 2/2024 | Ponnuswamy | G06F 3/067 |
| 11,941,116 B2 * | 3/2024 | Kutner | G06F 21/554 |

\* cited by examiner

*Primary Examiner* — Hosuk Song
(74) *Attorney, Agent, or Firm* — Trop, Pruner & Hu, P.C.

(57) ABSTRACT

Example implementations relate to deduplication operations in a storage system. An example includes receiving data units of a backup stream to be stored in a deduplication storage system; performing a first matching operation to match the data units against a first container index of a plurality of container indexes, where the plurality of container indexes comprise metadata indicating storage locations of data units previously stored in the persistent storage; calculating a first ratio indicating the amount of deduplication that occurred during the first matching operation against the first container index; and in response to a determination that the first ratio violates a condition with respect to local ratio history data of the first container index, identifying at least one portion of the backup stream as being potentially affected by a ransomware attack.

20 Claims, 8 Drawing Sheets

RANSOMWARE DETECTION IN A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
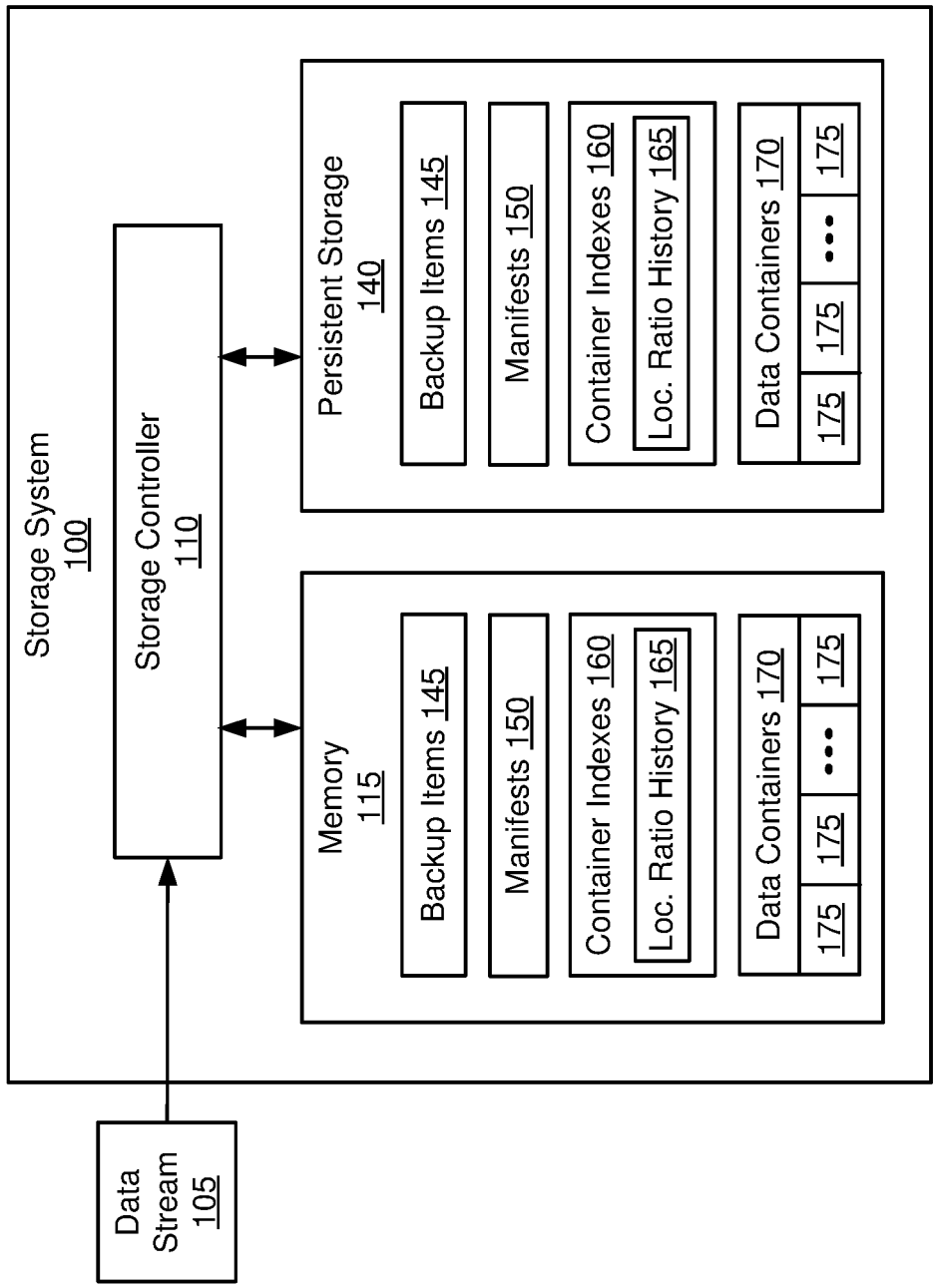
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams. For example, such metadata may include data recipes (also referred to herein as "manifests") that specify the order in which particular data units are received (e.g., in a data stream). The processing of each data stream may be referred to herein as a "backup process." Subsequently, in response to a read request, the deduplication system may use a set of manifests (also referred to herein as "item metadata") to determine the received order of data units, and may thereby recreate the original data stream. Accordingly, the set of manifests may be a representation of the original data stream. The manifests may include a sequence of records, with each record representing a particular set of data unit(s). The records of the manifest may include one or more fields that identify container indexes that include storage information for the data units. For example, a container index may include one or more fields that specify location information (e.g., containers, offsets, etc.) for the stored data units, compression and/or encryption characteristics of the stored data units, and so forth. The container index may include reference counts that indicate the number of manifests that reference each data unit.

In some examples, upon receiving a data unit (e.g., in a data stream), it may be matched against one or more container indexes to determine whether an identical chunk is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, a storage system may be vulnerable to a ransomware attack that encrypts the stored data. If a ransom is not paid to the attackers, the data may remain encrypted, and thus be rendered unusable. Accordingly, in some examples, the storage system may implement protective measures to detect and/or counter ransomware attacks. For example, the storage system may execute specialized programs that continually analyze characteristics of the stored data, and determine whether these characteristics match known profiles of data that has been encrypted by ransomware. However, such protective measures may require a significant amounts of computing resources (e.g., processing time, memory space, etc.). Further, such protective measures may not be able to detect the ransomware encryption until after the data has been stored in persistent storage, and has already overwritten an earlier (unaffected) stored copy of the data. Accordingly, in such examples, a significant amount of the valuable stored data may be encrypted by the ransomware.

In accordance with some implementations of the present disclosure, a controller of a deduplication storage system may perform a matching operation against a container index to deduplicate a set of data units from a backup data stream (e.g., by comparing fingerprints of the set of data units against fingerprints stored in the container index). The controller may calculate a ratio indicating the amount of deduplication that occurs during the matching operation. Further, the controller may determine whether the calculated ratio violates a condition with respect to local ratio history data stored in the container index. If so, the controller may identify the set of data units as potentially being encrypted by ransomware. In this manner, some implementations may provide detection of ransomware attacks without executing specialized programs that may consume significant computing resources. Further, some implementations may provide rapid identification of the specific data locations that are affected, and may reduce the amount of valuable data that is lost to malicious encryption. The disclosed technique for detecting ransomware is discussed further below with reference to FIGS. 1-8.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at least backup items 145, manifests 150, container indexes 160, and data containers 170. In some examples, copies of the manifests 150, container indexes 160, and the data containers 170 may be transferred between the memory 115 and persistent storage 140 (e.g., via read and write input/output (I/O) operations).

In some implementations, the storage system 100 may perform deduplication of stored data. For example, the storage controller 110 may receive an inbound data stream 105 including multiple data units, and may store at least one copy of each data unit in a data container 170 (e.g., by appending the data units to the end of the data container 170). In some examples, each data container 170 may be divided into entities 175, where each entity 175 includes multiple stored data units.

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index. If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may generate a backup item 145 to represent each received data stream 105 in a deduplicated form. Each backup item 145 may reference a number of manifests 150. The manifests 150 record the order in which the data units were received. Further, the manifests 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the manifest 150 to determine the sequence of data units that made up the original data. The storage controller 110 may then use pointer data included in the manifest 150 to identify the container indexes 160 associated with the data units. Further, the storage controller 110 may use information included in the identified container indexes 160 (and information included in the manifest 150) to determine the locations that store the data units (e.g., data container 170, entity 175, offsets, etc.), and may then read the data units from the determined locations.

In some implementations, each container index 160 may include a local ratio history 165, which may be a data structure to store historical information regarding deduplication ratios (also referred to herein as "local ratio history") for that container index 160. For example, the local ratio history 165 may include a list of ratio values indicating the amounts of deduplication that occurred during previous matching operations against the container index 160. In another example, the local ratio history 165 may be a rolling average based on the ratio values for the N most recent matching operations of the container index 160, where N is a specified integer.

In some implementations, the storage controller 110 may calculate a new ratio value based on a current matching operation against a container index 160, and may determine whether the new ratio value violates a condition with respect to the local ratio history 165 stored in that container index 160. For example, the storage controller 110 may calculate the average ratio value of the local ratio history 165, and may determine whether the new ratio value exceeds this average ratio value. If the new ratio value violates the condition with respect to the local ratio history 165, the storage controller 110 may take an action to indicate that the data stream may have been affected by a ransomware attack. Further, in some implementations, the storage controller 110 may use the container index 160 to identify specific portions of the data stream 195 that may have been affected by the ransomware attack. Example processes for identifying potential ransomware attacks are described below with reference to FIG. 4-5.

Figure 2:
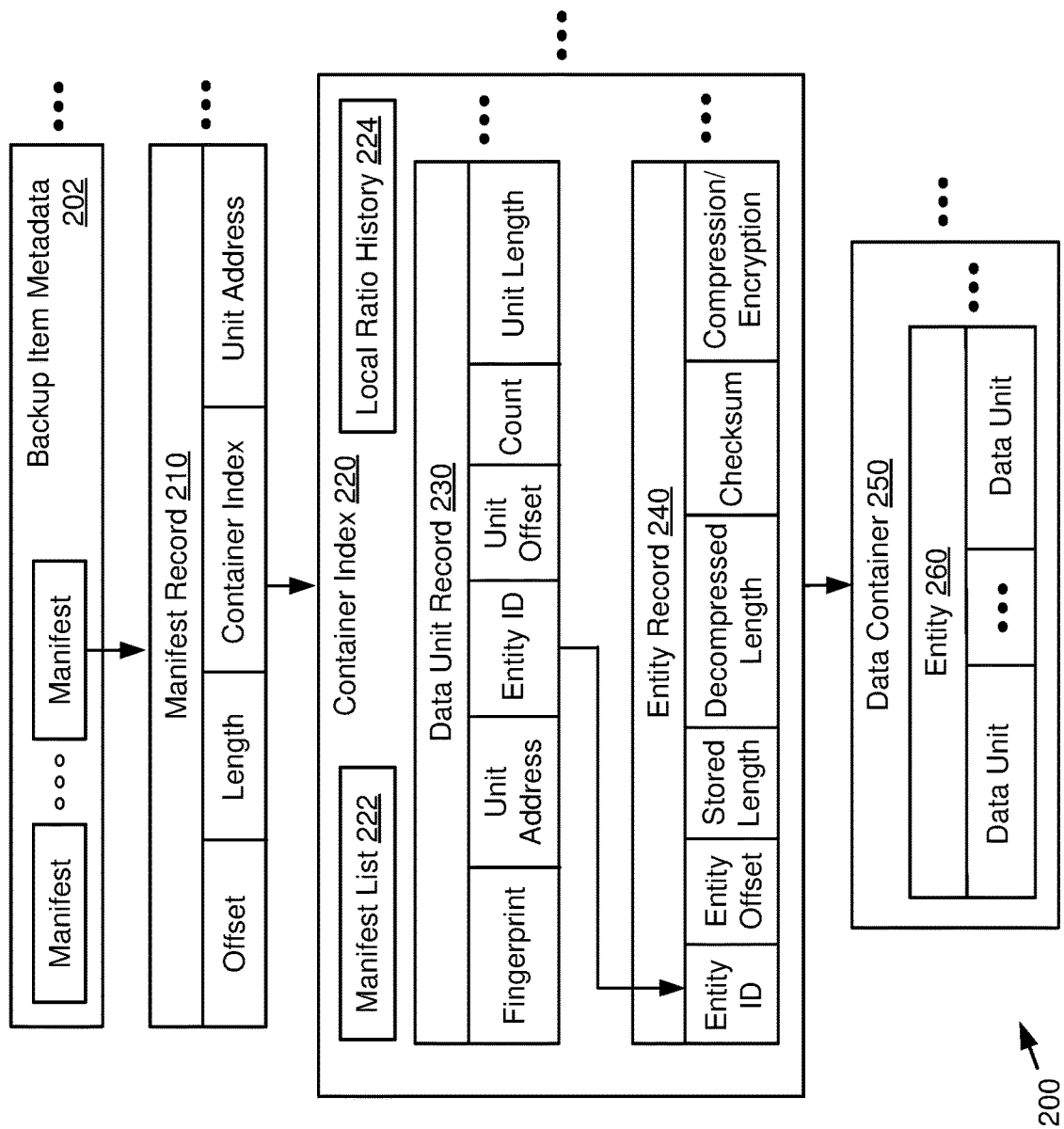
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include backup item metadata 202, a manifest record 210, a container index 220, and a data container 250. In some implementations, the backup item metadata 202 may include multiple manifest records 210. In some examples, the backup item metadata 202, the manifest record 210, the container index 220, and the data container 250 may correspond generally to example implementations of a backup item 145, a manifest 150, a container index 160, and a data container 170 (shown in FIG. 1), respectively. In some examples, the data structures 200 may be generated and/or managed by the storage controller 110 (shown in FIG. 1).

Although one of each is shown for simplicity of illustration in FIG. 2, data structures 200 may include a plurality of instances of backup item metadata 202, each including or pointing to one or more manifest records 210. In such examples, data structures 200 may include a plurality of manifest records 210. The manifest records 210 may reference a plurality of container indexes 220, each corresponding to one of a plurality of containers 250. Each container index 220 may comprise one or a plurality of data unit records 230, and one or a plurality of entity records 240.

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

In some implementations, each container index 220 may include a manifest list 222 and a local ratio history 224. The manifest list 222 may be a data structure to identify each manifest record 210 that references the container index 220. For example, each time that the container index 220 is generated or updated to include information regarding a particular manifest record 210, the manifest list 222 in that container index 220 is updated to store an identifier of that manifest record 210. Further, when the container index 220 is no longer associated with the manifest record 210, the identifier of the manifest record 210 is removed from the manifest list 222.

In some implementations, the local ratio history 224 may correspond generally to an example implementation of a local ratio history 165 (shown in FIG. 1). The local ratio history 224 may be a data structure to store historical information regarding deduplication ratios (also referred to herein as "local ratio history") for that container index 160. For example, the local ratio history 224 may store a list of deduplication ratios for previous matching operations against the container index 220. In another example, the local ratio history 224 may store a rolling average of previous deduplications ratios. Some example implementations of the local ratio history 224 are described below with reference to FIG. 3A-3B.

Figure 3A:
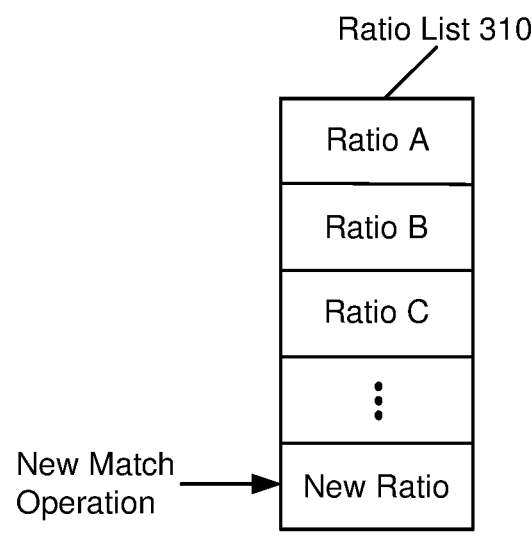
FIGS. 3A-3B are illustrations of example data structures, in accordance with some implementations.
Figure 3B:
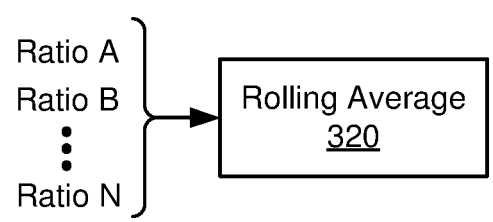

FIGS. 3A-3B—Example Data Structures

FIG. 3A shows an example ratio list 310 in accordance with some implementations. In some examples, the ratio list 310 may correspond generally to example implementation of the local ratio history 224 included in the container index 220 (shown in FIG. 2).

As shown in FIG. 3A, the ratio list 310 may be a list structure including a number of stored ratio values, where each ratio value is associated with a different matching operation of the container index storing the ratio list (e.g., a container index 160 shown in FIG. 1). In some implementations, each stored ratio value may be the ratio of the number of new data units (i.e., data units that are not matched to previously stored data units) divided the number of matched data units (i.e., data units that are matched to previously stored data units) during a particular matching operation (e.g., a past operation to compare the fingerprints of a set of multiple data units from a particular backup data stream against fingerprints in the container index). In some implementations, the ratio list 310 is to store a maximum number N of the most recent ratio values, where N is a positive integer (e.g., N=100, N=200, etc.). In other implementations, the ratio list 310 is to store an unlimited number of ratio values (e.g., beginning at a system boot-up event, a reset event, etc.).

In some implementations, a controller (e.g., storage controller 110 shown in FIG. 1) may calculate a new ratio value upon performing a new matching operation against the container index (e.g., a new operation to compare the fingerprints of a recently received set of multiple data units against fingerprints in the container index), and may determine whether the new ratio value violates a condition with respect to some or all of the ratio values stored in the ratio list 310. For example, the controller may determine whether the new ratio value exceeds the average value of a subset of the ratio list 310, where the subset includes a predefined number M of the most recent stored ratio values, and where M is a positive integer (e.g., M=10, M=20, and so forth). In another example, the controller may determine whether the new ratio value exceeds the average value of all ratio values stored in the ratio list 310. In yet another example, the controller may determine whether the new ratio value exceeds the average value of a subset (or all) of the stored ratio values by at least a specified percentage or amount (e.g., by at least 10% of the average value). In still another example, the controller may determine a rate of change of the stored ratio values over time, and may determine whether the new ratio value represents a change rate that exceeds the historical change rate (e.g., by at least a specified percentage or amount). Other examples are possible.

As illustrated in FIG. 3A, the new ratio value (e.g., calculated based on a new matching operation against the container index) may be inserted into the ratio list 310. For example, after determining whether the new ratio value violates the condition with respect to the previous ratio values of the ratio list 310, the controller may insert the new ratio value into the ratio list 310 (e.g., as the most recent ratio value).

Referring now to FIG. 3B, shown is an example rolling average field 320 in accordance with some implementations. In some examples, the rolling average field 320 may correspond generally to example implementation of the local ratio history 224 included in the container index 220 (shown in FIG. 2). In some implementations, the rolling average field 320 may store a value computed as the rolling average of the ratio values for the most recent N matching operations, where N is a positive integer.

In some implementations, a controller (e.g., storage controller 110 shown in FIG. 1) may calculate a new ratio value upon performing a new matching operation against the container index, and may determine whether the new ratio value violates a condition with respect to the value of the rolling average field 320. For example, the controller may determine whether the new ratio value exceeds the value of the rolling average field 320. In another example, the controller may determine whether the new ratio value exceeds the value of the rolling average field 320 by at least a specified percentage or amount. Other examples are possible.

In some implementations, the new ratio value (e.g., calculated based on a new matching operation against the container index) may be used to update the rolling average field 320. For example, after determining whether the new ratio value violates the condition with respect to the rolling average stored in the rolling average field 320, the controller may recalculate the rolling average, and may store the recalculated rolling average in the rolling average field 320 (e.g., by overwriting the previous rolling average).

Figure 4:
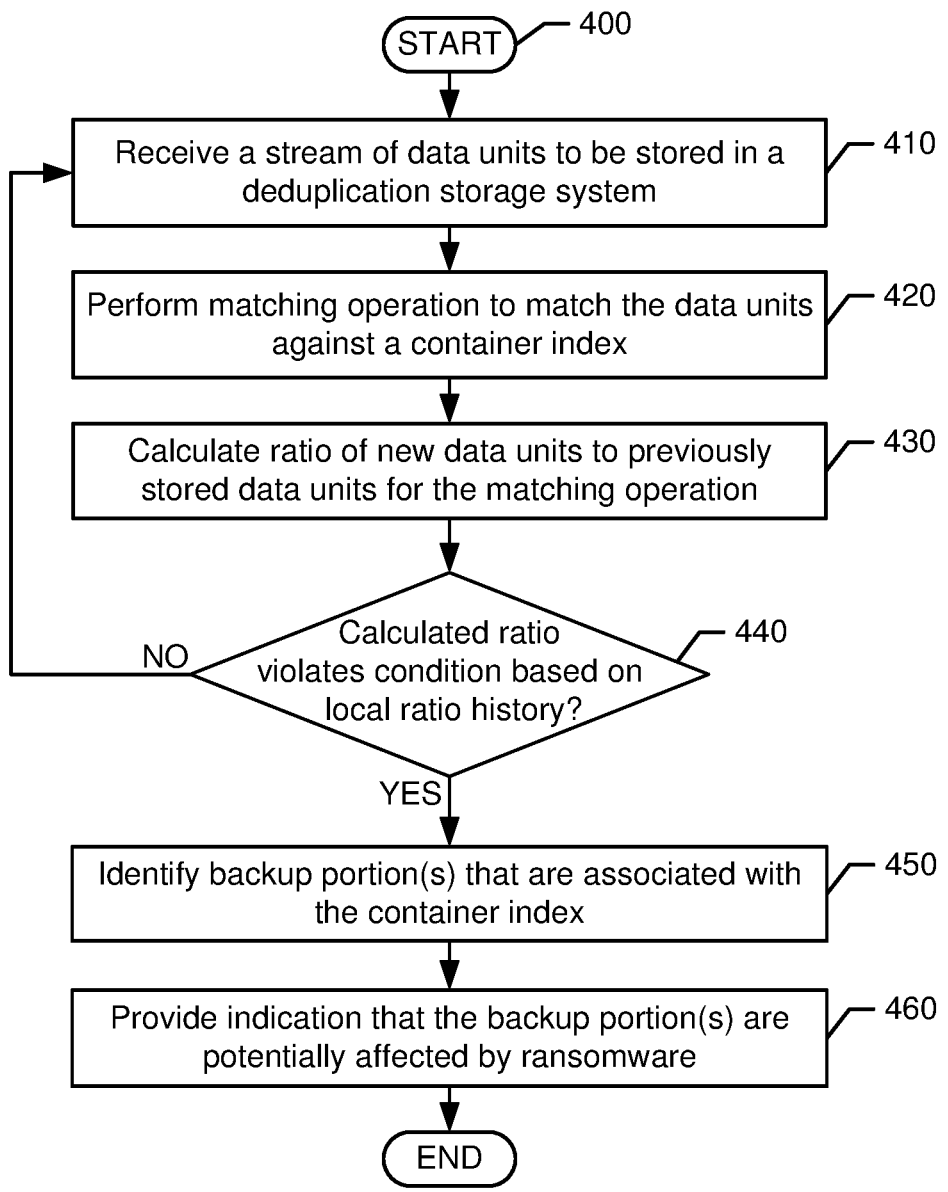
FIG. 4 is an illustration of an example process, in accordance with some implementations.

FIG. 4—Example Process for Ransomware Detection

FIG. 4 shows is an example process 400 for ransomware detection, in accordance with some implementations. For the sake of illustration, details of the process 400 may be described below with reference to FIGS. 1-3B, which show examples in accordance with some implementations. However, other implementations are also possible. In some examples, the process 400 may be performed using the storage controller 110 (shown in FIG. 1). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 410 may include receiving a stream of data units to be stored in a deduplication storage system. For example, referring to FIG. 1, the storage controller 110 generates a backup item 145 to represent the data stream 105. Further, the storage controller 110 records the order in which data units are received in a manifest 150.

Block 420 (shown in FIG. 4) may include performing a matching operation to match the data units against a container index. For example, referring to FIG. 1, the storage controller 110 receives a data stream 105 to be stored in the deduplication storage system 100. The storage controller 110 performs a matching operation of the received data units against a container index 160. To perform the matching operation, the storage controller 110 generates fingerprints for the received data units, and then compares the generated fingerprints to the fingerprints included in the container index 160. If a match is identified, then the storage controller 110 determines that a duplicate of an incoming data unit is already stored by the storage system 100. In response to this determination, the storage controller 110 stores a reference to the previous data unit (e.g., in a manifest 150) in deduplicated form, rather than storing a new copy of the incoming data unit.

Block 430 (shown in FIG. 4) may include calculating a ratio of new data units to previously stored data units for the matching operation. For example, referring to FIG. 1, the storage controller 110 monitors the number of new data units (i.e., data units that are not matched to previously stored data units) and the number of matched data units (i.e., data units that are matched to previously stored data units) during the matching operation (e.g., during an operation to compare the fingerprints of a set of multiple data units in the data stream 105 against fingerprints in the container index 160). Upon completing the matching operation, the storage controller 110 calculates a ratio value as the number of new data units divided by the number of matched data units. Decision block 440 (shown in FIG. 4) may include determining whether the calculated ratio violates a condition based on the local ratio history of the container index. If so, the process 400 may continue at block 450 (described below). Otherwise, if it is determined that the calculated ratio does not violate the condition, the process 400 may return to block 410 (e.g., to continue processing received data). For example, referring to FIGS. 1 and 3A, the storage controller 110 determines that the calculated ratio exceeds the average value of a set of ratio values in the ratio list 310 (e.g., all stored ratio values, the ten most recent stored ratio values, the twenty most recent stored ratio values, and so forth), and thereby detects a potential ransomware attack. In another example, referring to FIGS. 1 and 3B, the storage controller 110 determines that the calculated ratio exceeds the value of the rolling average field 320 by at least a specified percentage (e.g., 10%), and thereby detects a potential ransomware attack.

Block 450 (shown in FIG. 4) may include identifying backup portion(s) that are associated with the container index. Block 460 may include providing an indication that the backup portion(s) are potentially affected by ransomware. After block 460, the process 400 may be completed. For example, referring to FIG. 1, the storage controller 110 identifies portion(s) of the data stream 105 that are associated with the current container index 160, and initiates an alert indicating that the identified portion(s) are suspected of being encrypted by ransomware. The storage controller 110 can initiate other action(s) to respond to the detection of the potential ransomware attack (e.g., stopping the backup process, initiating a logging procedure, and so forth). An example process for identifying the specific portions of the data stream 105 that are potentially affected is described below with reference to FIG. 5.

Figure 5:
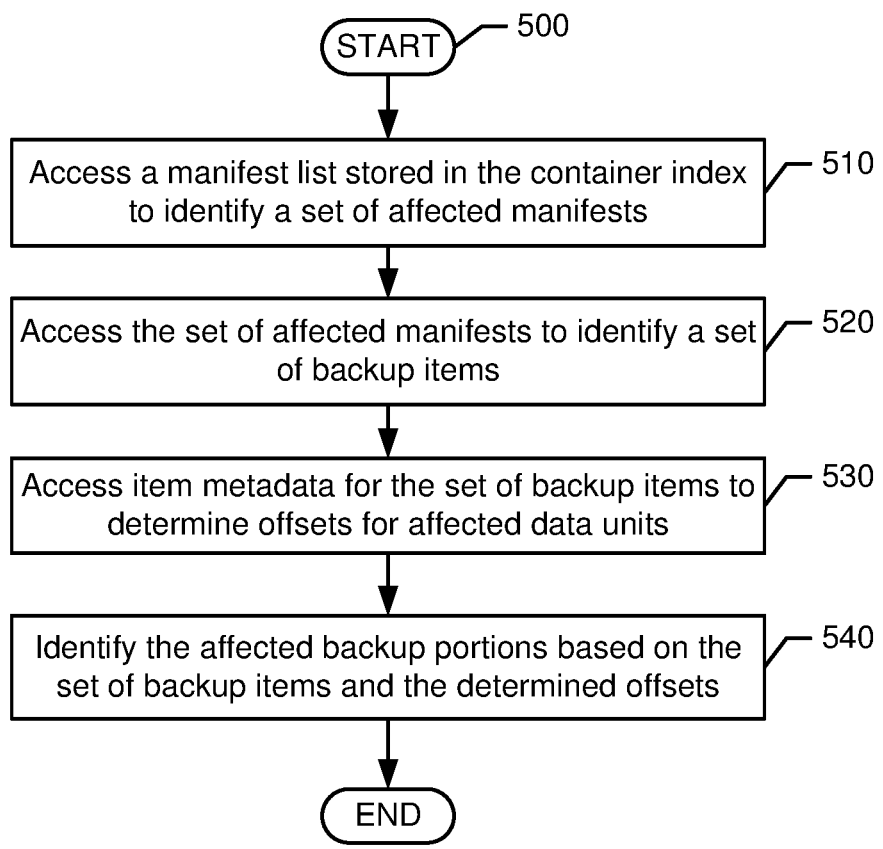
FIG. 5 is an illustration of an example process, in accordance with some implementations.

FIG. 5—Example Process for Identifying Affected Backup Portions

FIG. 5 shows is an example process 500 for identifying affected backup portions, in accordance with some implementations. The process 500 may illustrate an example expansion of block 450 (shown in FIG. 4). For the sake of illustration, details of the process 500 may be described below with reference to FIGS. 1-3B, which show examples in accordance with some implementations. However, other implementations are also possible. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 510 may include accessing a manifest list stored in the container index to identify a set of affected manifests. Block 520 may include accessing the set of affected manifests to identify a set of backup items. Block 530 may include accessing the item metadata for the set of backup items to determine offsets for affected data units. Block 540 may include identifying the affected backup portions based on the set of backup items and the determined offsets. After block 540, the process 500 may be completed.

For example, referring to FIGS. 1-2, the storage controller 110 determines that a current deduplication ratio (e.g., for a matching operation against a first container index 160) violates a condition based on the local ratio history 224 stored in the first container index 160. In response, the storage controller 110 reads the manifest list 222 (stored in the first container index 160) to identify a set of manifests 150 that are referenced by the first container index 160. The storage controller 110 loads each identified manifest 150 into memory 115, and uses the loaded manifest 150 to identify the data portions that refer to the first container index 160. For each loaded manifest 150, the storage controller 110 identifies a particular backup item 145 (e.g., using the identifier of the manifest 150), loads the corresponding backup item metadata 202 into memory 115. The storage controller 110 uses the backup item metadata 202 to determine the offset of the manifest in the backup item 145, and then determines the offsets of data units within the manifest 150 relative to the backup item 145. The storage controller 110 then provides an alert or indication to identify the affected backup portions using identifiers of the backup item(s) 145 and the determined offsets.

Figure 6:
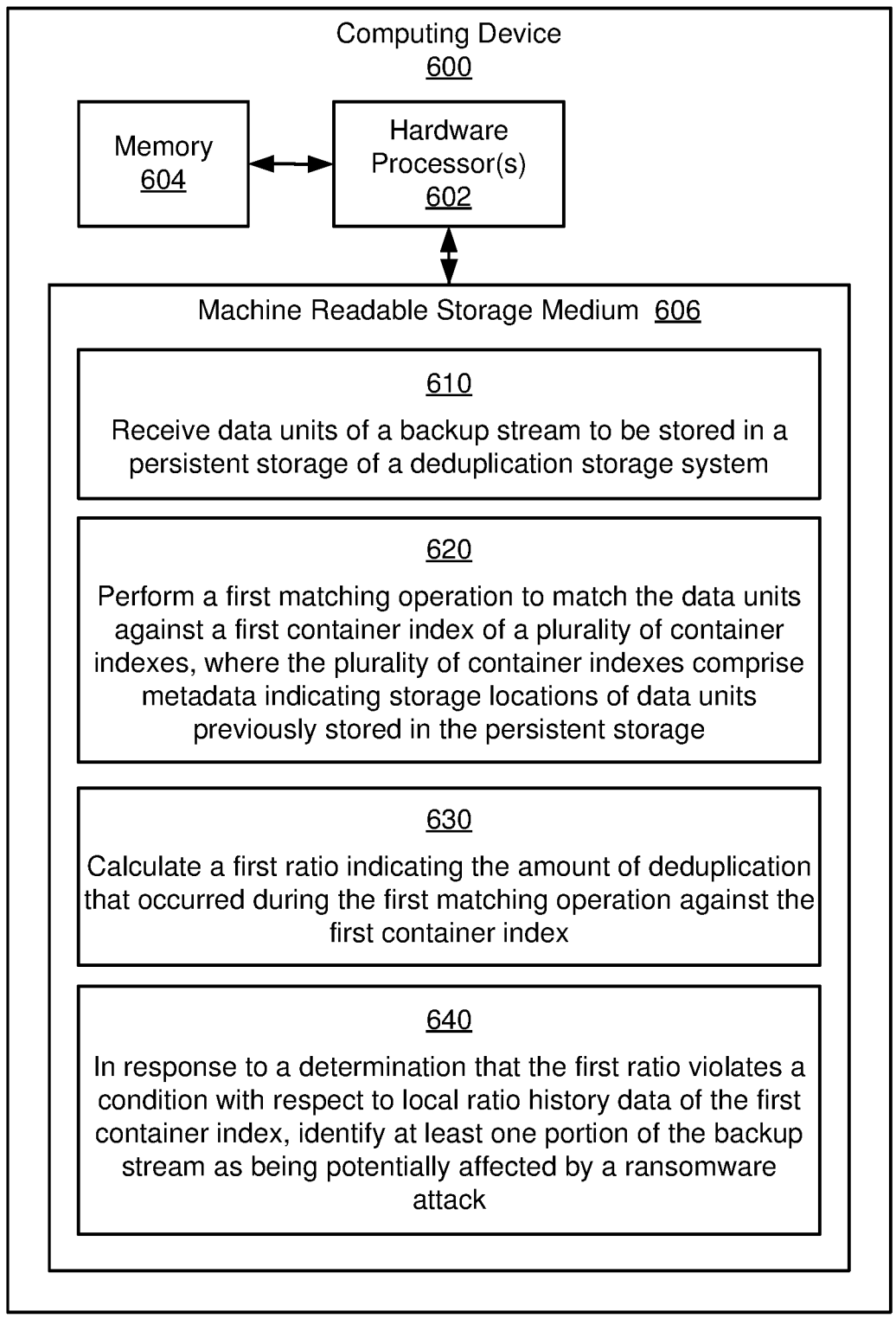
FIG. 6 is a schematic diagram of an example computing device, in accordance with some implementations.

FIG. 6—Example Computing Device

FIG. 6 shows a schematic diagram of an example computing device 600. In some examples, the computing device 600 may correspond generally to some or all of the storage system 100 (shown in FIG. 1). As shown, the computing device 600 may include a hardware processor 602, a memory 604, and machine-readable storage 605 including instructions 610-640. The machine-readable storage 605 may be a non-transitory medium. The instructions 610-640 may be executed by the hardware processor 602, or by a processing engine included in hardware processor 602.

Instruction 610 may be executed to receive data units of a backup stream to be stored in a persistent storage of a deduplication storage system. Instruction 620 may be executed to perform a first matching operation to match the data units against a first container index of a plurality of container indexes, where the plurality of container indexes comprise metadata indicating storage locations of data units previously stored in the persistent storage. For example, referring to FIG. 1, the storage controller 110 receives a data stream 105 to be stored in the deduplication storage system 100. The storage controller 110 performs a matching operation by generating fingerprints for a set of data units in the data stream 105, and comparing the generated fingerprint to the fingerprints included in the container index 160. If a match is identified, then the storage controller 110 determines that a duplicate of the incoming data unit is already stored by the storage system 100. In response to this determination, the storage controller 110 stores a reference to the previous data unit (e.g., in a manifest 150) in deduplicated form, rather than storing a new copy of the incoming data unit.

Instruction 630 may be executed to calculate a first ratio indicating the amount of deduplication that occurred during the first matching operation against the first container index. Instruction 640 may be executed to, in response to a determination that the first ratio violates a condition with respect to local ratio history data of the first container index, identify at least one portion of the backup stream as being potentially affected by a ransomware attack. For example, referring to FIG. 1, the storage controller 110 calculates a ratio value for the matching operation as the number of new data units divided by the number of matched data units. Further, For example, referring to FIGS. 1-3A, the storage controller 110 detects a potential ransomware attack upon determining that the calculated ratio exceeds the average value of a set of ratio values in the ratio list 310. Further, the storage controller 110 uses metadata (e.g., the manifest list 222 in the container index 160, one or more manifests 150, one or more backup items 145, and so forth) to identify the portions of the data stream 105 that are suspected of being encrypted by ransomware. An alert may be provided (e.g., to a user, application, etc.) to identify the affected backup portions (e.g., specific localities in the data stream 105).

Figure 7:
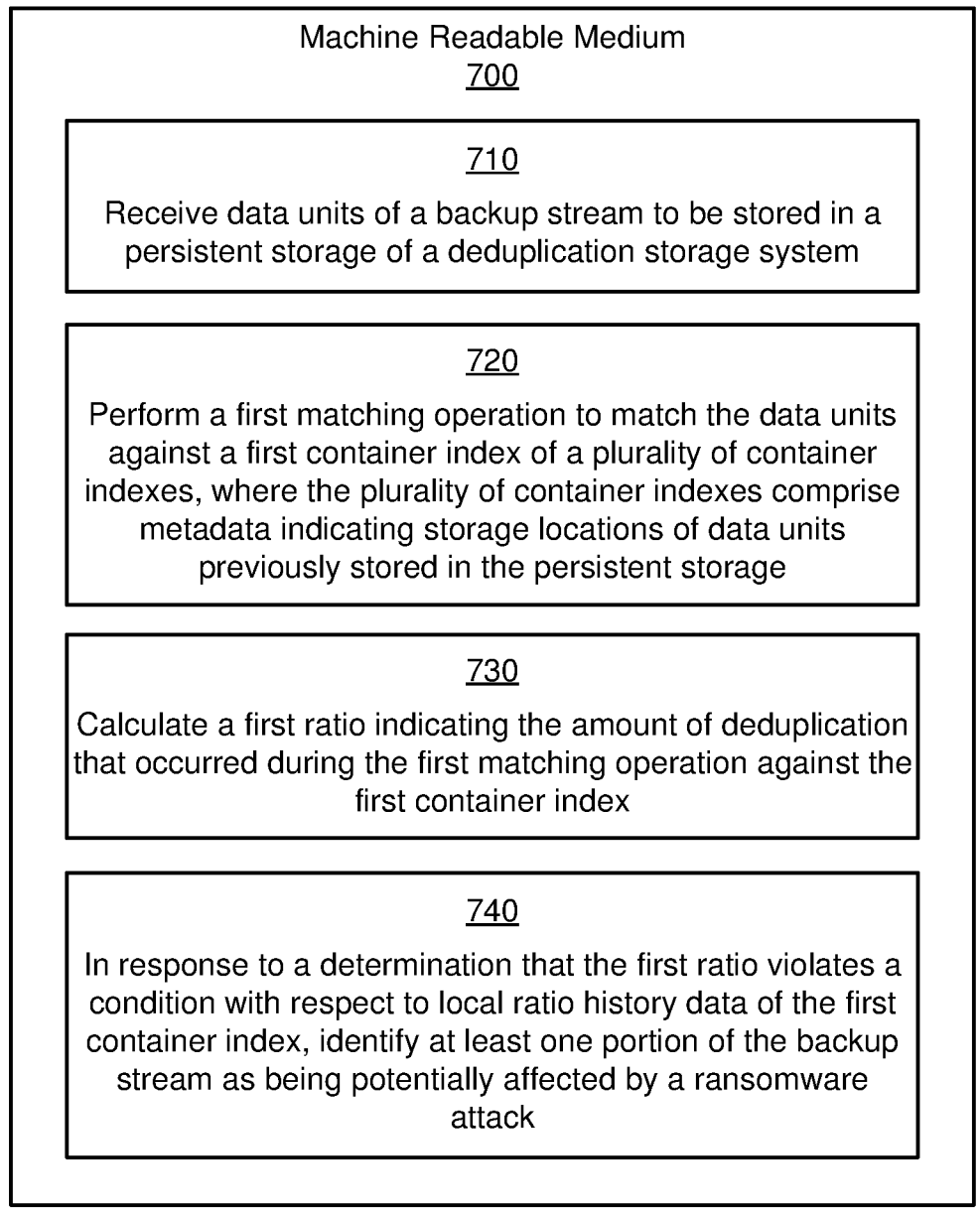
FIG. 7 is a diagram of an example machine-readable medium storing instructions in accordance with some implementations.

FIG. 7—Example Machine-Readable Medium

FIG. 7 shows a machine-readable medium 700 storing instructions 710-740, in accordance with some implementations. The instructions 710-740 can be executed by a single processor, multiple processors, a single processing engine, multiple processing engines, and so forth. The machine-readable medium 700 may be a non-transitory storage medium, such as an optical, semiconductor, or magnetic storage medium.

Instruction 710 may be executed to receive data units of a backup stream to be stored in a persistent storage of a deduplication storage system. Instruction 720 may be executed to perform a first matching operation to match the data units against a first container index of a plurality of container indexes, where the plurality of container indexes comprise metadata indicating storage locations of data units previously stored in the persistent storage.

Instruction 730 may be executed to calculate a first ratio indicating the amount of deduplication that occurred during the first matching operation against the first container index. Instruction 740 may be executed to, in response to a determination that the first ratio violates a condition with respect to local ratio history data of the first container index, identify at least one portion of the backup stream as being potentially affected by a ransomware attack.

Figure 8:
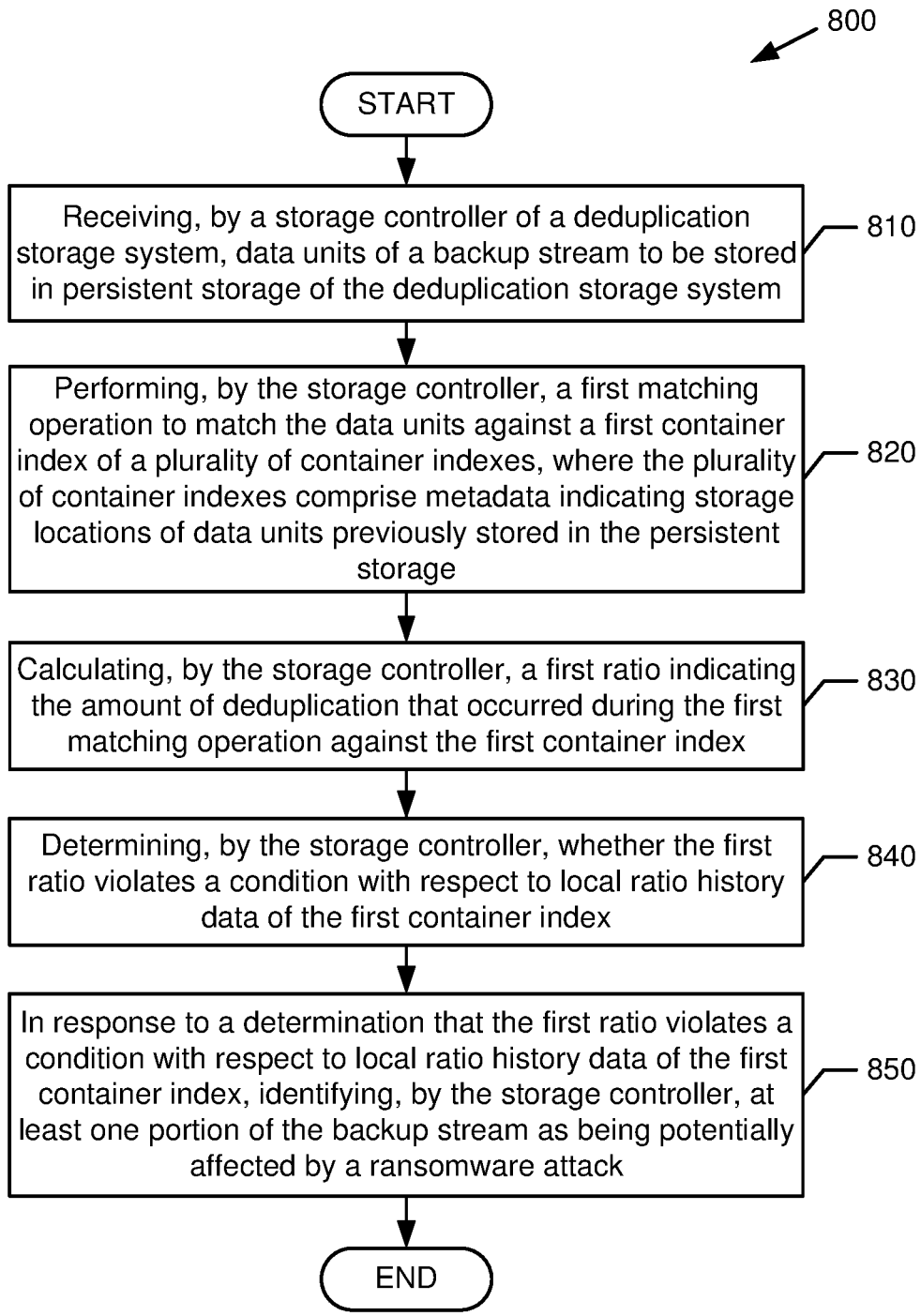
FIG. 8 is an illustration of an example process, in accordance with some implementations.

FIG. 8—Example Process for Ransomware Detection

FIG. 8 shows is an example process 800 for ransomware detection, in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving, by a storage controller of a deduplication storage system, data units of a backup stream to be stored in persistent storage of the deduplication storage system. Block 820 may include performing, by the storage controller, a first matching operation to match the data units against a first container index of a plurality of container indexes, where the plurality of container indexes comprise metadata indicating storage locations of data units previously stored in the persistent storage.

Block 830 may include calculating, by the storage controller, a first ratio indicating the amount of deduplication that occurred during the first matching operation against the first container index. Block 840 may include determining, by the storage controller, whether the first ratio violates a condition with respect to local ratio history data of the first container index. Block 850 may include, in response to a determination that the first ratio violates a condition with respect to local ratio history data of the first container index, identifying, by the storage controller, at least one portion of the backup stream as being potentially affected by a ransomware attack. After block 850, the process 800 may be completed.

In accordance with implementations described herein, a controller of a deduplication storage system may perform a matching operation against a container index to deduplicate a set of data units from a backup data stream. The controller may calculate a ratio indicating the amount of deduplication that occurs during the matching operation. Further, the controller may determine whether the calculated ratio violates a condition with respect to local ratio history data stored in the container index. If so, the controller may identify the set of data units as potentially being encrypted by ransomware. In this manner, some implementations may provide detection of ransomware attacks without executing specialized programs that may consume significant computing resources. Further, some implementations may provide rapid identification of the specific data locations that are affected, and may reduce the amount of valuable data that is lost to malicious encryption. The disclosed technique for detecting ransomware is discussed further below with reference to FIGS. 1-8.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
   a processor;
   a memory; and
   a machine-readable storage storing instructions, the instructions executable by the processor to:
   receive data units of a backup stream to be stored in a persistent storage of a deduplication storage system;
   perform a first matching operation to match the data units against a first container index of a plurality of container indexes, wherein the plurality of container indexes comprise metadata indicating storage locations of data units previously stored in the persistent storage;
   calculate a first deduplication ratio indicating the an amount of deduplication that occurred during the first matching operation against the first container index; and
   identify at least one portion of the backup stream associated with the first container index as being potentially affected by a ransomware attack, based on a determination that the first deduplication ratio violates a condition with respect to local ratio history data of the first container index, wherein the local ratio history data represents deduplication ratios for previous matching operations for the first container index.

2. The computing device of claim 1, wherein the local ratio history data of the first container index comprises a list structure to store a plurality of stored ratio values, and wherein each stored ratio value corresponds to a different matching operation of the first container index.

3. The computing device of claim 2, wherein the list structure is to store a maximum number N of recent ratio values, where N is a positive integer.

4. The computing device of claim 2, wherein the list structure is to store an unlimited number of ratio values.

5. The computing device of claim 2, wherein the determination that the first ratio violates the condition comprises a determination that the first ratio exceeds an average value of a set of the stored ratio values in the list structure, wherein the set includes a predefined number M of the most recent stored ratio values, and wherein M is a positive integer.

6. The computing device of claim 1, wherein the local ratio history data of the first container index comprises a field to store a rolling average of ratio values for a set of most recent matching operations of the first container index.

7. The computing device of claim 6, wherein the determination that the first ratio violates the condition comprises a determination that the first ratio exceeds the stored rolling average by at least a predefined percentage.

8. The computing device of claim 1, including instructions executable by the processor to:
   identify the at least one portion of the backup stream based on a manifest list stored in the first container index, wherein the manifest list is a data structure to identify each manifest that references the first container index.

9. The computing device of claim 8, including instructions executable by the processor to:
   access the manifest list stored in the first container index to identify a set of affected manifests;
   access the set of affected manifests to identify a set of backup items;
   access item metadata for the set of backup items to determine offsets for affected data units; and
   identify the at least one affected portion based on the set of backup items and the determined offsets.

10. A method comprising:
    receiving, by a storage controller of a deduplication storage system, data units of a backup stream to be stored in persistent storage of the deduplication storage system;
    performing, by the storage controller, a first matching operation to match the data units against a first container index of a plurality of container indexes, wherein the plurality of container indexes comprise metadata indicating storage locations of data units previously stored in the persistent storage;
    calculating, by the storage controller, a first ratio indicating the amount of deduplication that occurred during the first matching operation against the first container index;
    determining, by the storage controller, whether the first ratio violates a condition with respect to local ratio history data of the first container index; and
    identifying, by the storage controller, at least one portion of the backup stream associated with the first container index as being potentially affected by a ransomware attack, based on a determination that the first ratio violates a condition with respect to local ratio history data of the first container index, wherein the local ratio history data represents deduplication ratios for previous matching operations for the first container index.

11. The method of claim 10, wherein the local ratio history data of the first container index comprises a list structure to store a plurality of stored ratio values, and wherein each stored ratio value corresponds to a different matching operation of the first container index.

12. The method of claim 11, wherein the determination that the first ratio violates the condition comprises a determination that the first ratio exceeds an average value of a set of the stored ratio values in the list structure, wherein the set includes a predefined number M of the most recent stored ratio values, and wherein M is a positive integer.

13. The method of claim 10, wherein the local ratio history data of the first container index comprises a field to store a rolling average of ratio values for a set of most recent matching operations of the first container index.

14. The method of claim 13, wherein the determination that the first ratio violates the condition comprises a determination that the first ratio exceeds the stored rolling average by at least a predefined percentage.

15. The method of claim 10, further comprising:
    accessing a manifest list stored in the first container index to identify a set of affected manifests, wherein the manifest list is a data structure to identify each manifest that references the first container index;
    accessing the set of affected manifests to identify a set of backup items;
    accessing item metadata for the set of backup items to determine offsets for affected data units; and
    identifying the at least one affected portion based on the set of backup items and the determined offsets.

16. A non-transitory machine-readable medium storing instructions that upon execution cause a processor to:
    receive data units of a backup stream to be stored in a persistent storage of a deduplication storage system;
    perform a first matching operation to match the data units against a first container index of a plurality of container indexes, wherein the plurality of container indexes comprise metadata indicating storage locations of data units previously stored in the persistent storage;

calculate a first ratio indicating the amount of deduplication that occurred during the first matching operation against the first container index; and identify at least one portion of the backup stream associated with the first container index as being potentially affected by a ransomware attack, based on a determination that the first ratio violates a condition with respect to local ratio history data of the first container index, wherein the local ratio history data represents deduplication ratios for previous matching operations for the first container index.

17. The non-transitory machine-readable medium of claim 16, wherein the local ratio history data of the first container index comprises a list structure to store a plurality of stored ratio values, and wherein each stored ratio value corresponds to a different matching operation of the first container index.

18. The non-transitory machine-readable medium of claim 17, wherein the determination that the first ratio violates the condition comprises a determination that the first ratio exceeds an average value of a set of the stored ratio values in the list structure, wherein the set includes a predefined number M of the most recent stored ratio values, and wherein M is a positive integer.

19. The non-transitory machine-readable medium of claim 16, wherein the local ratio history data of the first container index comprises a field to store a rolling average of ratio values for a set of most recent matching operations of the first container index, and wherein the determination that the first ratio violates the condition comprises a determination that the first ratio exceeds the stored rolling average by at least a predefined percentage.

20. The non-transitory machine-readable medium of claim 16, including instructions that upon execution cause the processor to:

access a manifest list stored in the first container index to identify a set of affected manifests, wherein the manifest list is a data structure to identify each manifest that references the first container index;

access the set of affected manifests to identify a set of backup items;

access item metadata for the set of backup items to determine offsets for affected data units; and identify the at least one affected portion based on the set of backup items and the determined offsets.

* * * * *